(12) United States Patent
Boenke et al.

(10) Patent No.: US 7,510,985 B1
(45) Date of Patent: Mar. 31, 2009

(54) METHOD TO MANUFACTURE HIGH-PRECISION RFID STRAPS AND RFID ANTENNAS USING A LASER

(75) Inventors: Andreas Boenke, Hannover (DE); Dieter J. Meier, Bad Nenndorf (DE)

(73) Assignee: LPKF Laser & Electronics AG (DE)

( * ) Notice: Subject to any disclaimer, the term of this patent is extended or adjusted under 35 U.S.C. 154(b) by 237 days.

(21) Appl. No.: 11/260,078

(22) Filed: Oct. 26, 2005

(51) Int. Cl.
*H01L 21/00* (2006.01)
(52) U.S. Cl. ............. 438/795; 438/662; 438/792; 438/708; 438/904; 257/E21.328; 257/E21.596
(58) Field of Classification Search ............. 438/795, 438/792, 662, 707, 708, 940; 257/E21.328, 257/E21.517, E21.596, E21.331, E27.114
See application file for complete search history.

(56) References Cited

U.S. PATENT DOCUMENTS

| | | | |
|---|---|---|---|
| 4,081,653 A | 3/1978 | Koo et al. | |
| 5,018,164 A | 5/1991 | Brewer et al. | |
| 5,104,480 A | 4/1992 | Wojnarowski et al. | |
| 5,160,823 A | 11/1992 | Bennin et al. | |
| 5,294,290 A * | 3/1994 | Reeb ............. | 216/6 |
| 5,575,930 A | 11/1996 | Tietje-Girault et al. | |
| 6,203,952 B1 | 3/2001 | O'Brien et al. | |
| 6,399,258 B2 | 6/2002 | O'Brien et al. | |
| 6,602,790 B2 | 8/2003 | Kian et al. | |
| 6,662,439 B1 | 12/2003 | Bhullar | |
| 6,762,124 B2 | 7/2004 | Kian et al. | |
| 6,814,844 B2 | 11/2004 | Bhullar et al. | |
| 6,866,758 B2 | 3/2005 | Bhullar et al. | |
| 6,911,621 B2 | 6/2005 | Bhullar et al. | |
| 2002/0110944 A1 | 8/2002 | Kian et al. | |
| 2003/0092267 A1 | 5/2003 | Kian et al. | |
| 2004/0149986 A1 | 8/2004 | Dubowski et al. | |
| 2004/0194302 A1 | 10/2004 | Bhullar et al. | |
| 2004/0206625 A1 | 10/2004 | Bhullar et al. | |
| 2005/0103624 A1 | 5/2005 | Bhullar et al. | |
| 2005/0136471 A1 | 6/2005 | Bhullar et al. | |

FOREIGN PATENT DOCUMENTS

| | | |
|---|---|---|
| DE | 3843230 A1 | 9/1989 |
| DE | 199 51 721 A | 10/1999 |
| WO | WO 01/25775 A1 | 4/2001 |
| WO | WO 0125775 A1 | 4/2001 |
| WO | WO 0136953 A1 | 5/2001 |

OTHER PUBLICATIONS

Wight, Getting in Line for RFID, Labels & Labeling Jun./Jul. 2005, Tarsus Publishing Inc. WI USA.
K. Daming, Integrating Tags Into Flexo-Printed Webs, Smart Labels USA 2005 Conference Jun. 28-29 Baltimore 2005. (Presentation Slides).

(Continued)

*Primary Examiner*—Caridad M Everhart

(57) ABSTRACT

A method is described for the manufacture of structured flexible metallic patterns in which a metallic layer on a flexible substrate is structured using laser ablation. The flexible patterns manufactured in this fashion may be used as interposers (strap) for RFID tags or RFID antennas.

23 Claims, 4 Drawing Sheets

OTHER PUBLICATIONS

D. Engels, An Inkling of Things to Come, Packaging & Converting Intelligence, Spring 2005, p. 75, SPG Media Ltd., London.

D. Meier Laser Structuring of Fine Lines, Circuitree Sep. 1, 2000 (see www.circuitree.com).

Meir, Dieter, Sensor and Sensor Elements Manufacturing: Laser Direct Patterning (LDP) for Reel to Reel Processing to generate High Throughput, published May 13, 2003, Nürnberg, Germany.

* cited by examiner

METHOD TO MANUFACTURE HIGH-PRECISION RFID STRAPS AND RFID ANTENNAS USING A LASER

CROSS-REFERENCE TO RELATED APPLICATIONS

Not applicable.

STATEMENT REGARDING FEDERALLY SPONSORED RESEARCH

Not applicable

SEQUENCE LISTING

Not applicable

BACKGROUND OF THE INVENTION

1. Field of the Invention

The invention refers to the manufacture of metallic patterns or structures upon a flexible substrates using the method of laser ablation and the use of the resulting metallic patterned substrates for RFID straps and RFID antennas.

2. Description of Prior Art

The name RFID stands for Radio Frequency Identification and is used in specially developed systems for automatic identification of items, such as goods or persons or both, using radio transmission. An RFID system comprises a transponder and a reading device. The transponder comprises an integrated circuit microchip (chip) and an antenna. In its simplest form, the transponder is made by forming the antenna on a substrate and electrically connecting the chip to the antenna. The transponder is also known as an RFID inlay.

An RFID tag or RFID label, is a label or a tag having an embedded RFID inlay. Common commercial systems often comprise labelling (e.g., paper label materials), an inlay, a liner (carrier substrate for the inlay) and other application-specific packaging components such as printed surfaces for the labelling. See FIG. 1.

The continued and future successful commercialization of RFID systems depends upon low cost mass production processes. The prior art methods for manufacturing RFID antennas and RFID straps have reached their limits in regards to high volume production.

The case of RFID antennas provides an example of the aforementioned limitation. Antennas are usually manufactured from such materials as copper (Cu), aluminium (Al), silver (Ag), carbon in the form of graphite (C), or a conducting polymer, such as polythiophene. Accordingly, various standard technologies have been developed to process these materials into RFID antennas, for example, photo-lithographic or etching techniques, printing techniques (screen printing, engrave printing, flexo-printing), inkjet printing, galvanic techniques, sputter technologies.

There is an increasing demand for antennas to accommodate higher frequencies (for example 2.45 GHz as opposed to frequencies in the MHz range), to be more selective, to have longer transmission ranges and to have smaller dimensions. For example, in a passive RFID system, increasing the number of windings in a loop antenna of a small RFID inlay allows the tag to capture more energy to power the chip and transmit its information to an RFID reader. These antennas must be more precise and thus have less tolerance for variations in winding or loop widths. For examples of such antennas, see www.fractalantenna.com.

The above mentioned conventional technologies, however, have reached their tolerance limits and cannot manufacture such exacting antennas in a continuous process, such as in a reel-to-reel device, and therefore, these conventional technologies are not suitable for low-cost production, i.e., mass production, of these precise antennas.

Likewise current practice has reached a limit in regards to the speed in the manufacture of inlays. As discussed above, the inlay, i.e., transponder, comprises an antenna and a microchip which are electrically connected. A number of different techniques have been developed to connect the chip to the antenna, such as the flip-chip process. In this process, a robotic arm picks-up and places the chip onto the antenna. The electrical connection is achieved using isotropic or anisotropic adhesives. This process is normally performed under clean room conditions to limit contamination of the electrical connections. The placement of the chips upon the antennas must be very precise and accurate, because the dimensions of the chip's bumps, i.e., the electrical connection points of the chip, are smaller than 50 µm. Accordingly, because of the required precision and clean room conditions required, the flip-chip process represents a critical and limiting path to the high volume and high speed production of transponders.

Because of the limitations of the flip-chip process, the use of an "interposer", also called a "strap," was developed to speed up the production of inlays. A strap is a carrier for the chip. In this technique, the chip is conductively connected to a flexible substrate coated with an electrically conductive material such as a metal, i.e., the strap, and in turn, the chip-strap assembly is conductively connected to the RFID antenna. The flexible substrate may comprise an insulating polymer such as polyester, polycarbonate, polyimide, liquid crystal polymer (LCP), among others. One side of the substrate is selectively covered with metal structures. The microchip is thus electrically connected to the metal structures of the strap using conventional techniques of direct chip attachment. Such techniques are already known in the art and not discussed here.

The strap-chip assembly is then bonded to the antenna using conventional assembly techniques, thereby forming the transponder. Unlike the "direct chip attachment" to the antenna method, the strap methods require a much lower level of precision during assembly because the electrical contacts between the strap and antenna have dimensions which are in the mm range (compared with the smaller dimensions of chip's bumps). As a result it is possible to realise an assembly process in which the strap is connected with the antenna using mass production techniques, such as the use of a reel to reel device.

The bonding of the electrical contacts (pads) of the strap to the microchip, however, requires the utmost dimensional precision. Previously the conductive structures of the straps have been produced using techniques such as those discussed above, namely, screen print, ink jet, photo-lithographic techniques, and etching. These techniques have the disadvantage of offering only limited precision in terms of structural resolution. In a reel-to-reel screen print process using a special rotation screen print technique and speeds of approximately 100 meter per minute, the bonding geometries have a precision of approximately greater than 100 µm. Although photolithographic processes are able to work in dimensions of less than 100 µm, they are too slow for the reel-to-reel process because of the step and repeat procedures demanded during exposure, which increases costs. A further aspect requires illustration at this juncture. In order to achieve high assembly rates for microchips on straps when implementing a reel-to-reel technique, a key factor is the precision of the structures placed on the straps layout (arrangement of the conductive structures on the substrate) and the precision of the repeated replication of the individual layouts (i.e. distance of one interposer to the next interposer). Only by achieving high precision is it possible to reliably realise maximum accuracies and throughputs in the assembly process. Therefore, optimal image identification and replication and minimal readjustment at point of placement are crucial and decisive factors in the overall production rate of the assembly process.

SUMMARY OF THE INVENTION

The invention refers to the use of lasers to manufacture high precision structures for RFID straps and RFID antennas. The straps and antennas comprise flexible organic substrate materials coated with thin electrically conductive films such as a film of metal. The laser technology applied in accordance with the invention enables the structuring of such conductive coats producing a layout of structures having widths and gaps between each structures having dimensions as small as 15 µm. The tolerance fluctuations within the layout of an interposer or an antenna will be less then plus or minus 2 microns when compared to the dimensions of a predetermined model layout.

The method developed in accordance with the invention for the production of RFID interposers or RFID antennas is implemented in the form of a reel-to-reel process enabling high production rates. A reel to reel device that can accommodate the invention is already known in the art. For a description of such a device, see the following webpages: "http://www.lpkf.com/products/microvias-microstructures/laser-direct-patterning/microline-laser-reel-to-reel.htm" and "http://www.lpkf.com/products/microvias-microstructures/laser-direct-patterning/microline-laser-reel-to-reel-videos.htm."

DETAILED DESCRIPTION OF THE INVENTION

The invention provides exacting geometric constancy and repeatability of the individual structures as well as the arrangement and tolerance of the laser structures on a continuous web or tape. The implementation of the laser technology in accordance with the invention achieves tolerances (defined as deviation of the actual value and target value of a distance) of less than 10 µm. This level of tolerance refers both to the spacing of the individual interposers (straps) as well as layout deviations in both x and y direction including angle of rotation.

Flexible insulating substrate materials suitable in accordance with the invention may comprise all standard flexible materials such as polyesters, polyimides, polycarbonates, polyetherketone (PEK), polyetheretherketone (PEEK), liquid crystal polymer (LCP), provided the flexible material is amendable to the adhesion of metallic layers to its surfaces. The insulating material may have a thickness of no more than approximately 350 micron. The coating of these materials may be accomplished by, but not limited to, sputtering, vaporisation, chemical vapour deposition, chemical/galvanic coating or other techniques.

The conductive layer to be structured may have a minimum thickness of 50 nanometers (nm) said layer may be comprised of several layers of metallic coating. In order to improve the adhesion of the metallic coats to the flexible material it is possible, for example, to use tie-coats based on, for example, Chromium (Cr), Titanium (Ti), Monel, etc. In accordance with the invention, such materials may also be structured using laser techniques.

In accordance with the invention the structuring is implemented using Excimer lasers which operate using conventional mask projection techniques or UV lasers with a X-Y coordinate scanner system. In the case of straps, the implementation of subsequent galvanic metallization in a reel-to-reel process enables the addition of additional functional metallic layers, e.g. copper, nickel, gold. In order to implement such techniques, the configuration of the layout must be adjusted accordingly in order to ensure that all individual laser structures can be electrically linked to one another to allow the galvanic additions. These links may then be removed by separating the structures after assembly. Separation is achieved using for example stamping, cutting or laser techniques. This is further discussed below in regards to FIG. 5.

In the manufacture of RFID antennas the required quality may be achieved by using galvanic deposition of copper. The individual RFID antennas produced in accordance with the invention must be connected electrically. See the discussion below regarding FIG. 5. The metal deposition may also be performed using reel-to-reel techniques.

Figure 1:
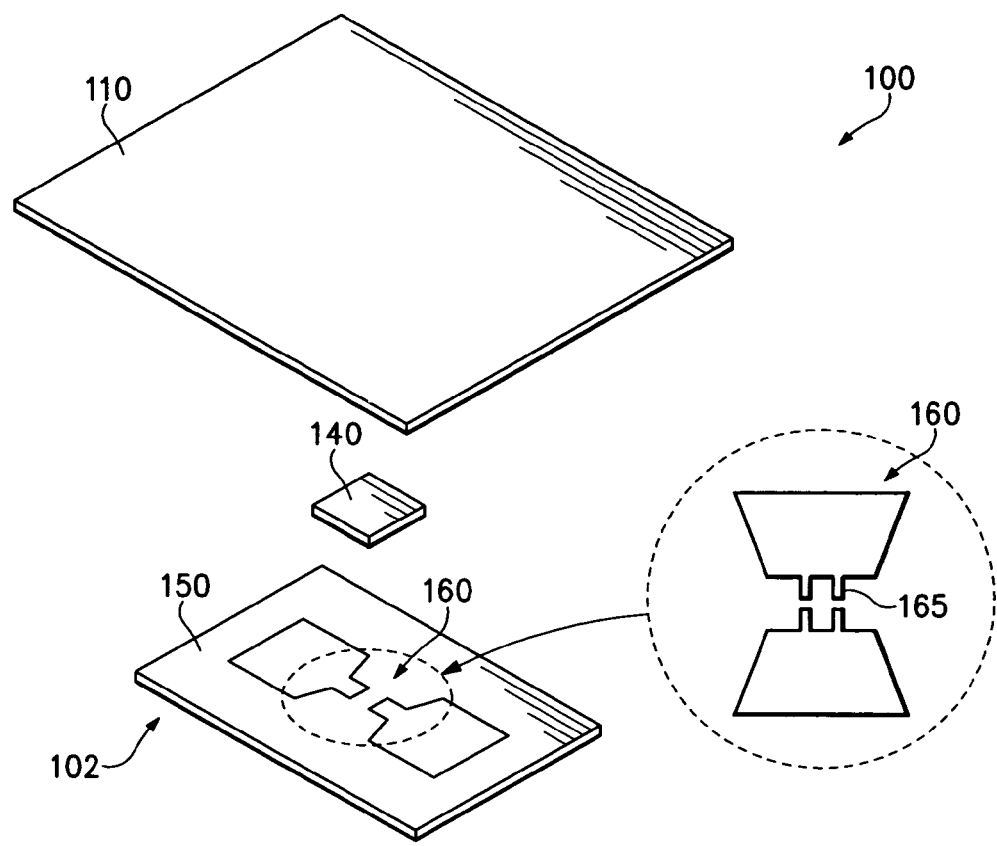
FIG. 1 is an exploded view of an RFID tag.
Figure 1:
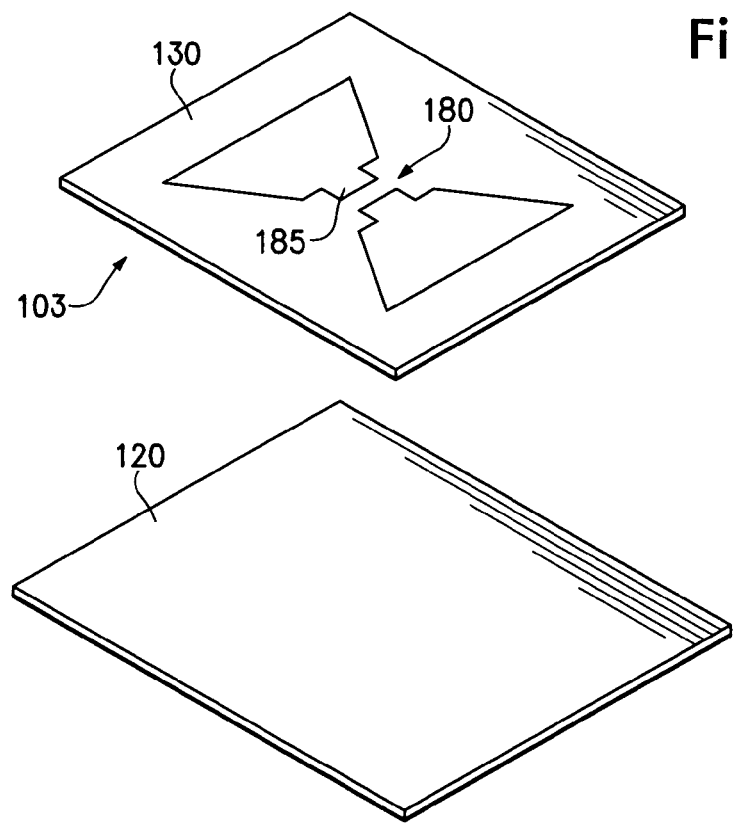

FIG. 1 illustrates the general make-up of an RFID tag incorporating the interposer/strap technology. RFID tag 100 comprises several components such as label surface stock 110, liner 120 and inlay 101. Label surface stock 110 and liner 120 are used for identification (printing) and stability. The inlay comprises the following components, microchip (chip) 140, strap 102 and antenna assembly 103. The antenna assembly 103 further comprises antenna carrier 130 and antenna 180. Antenna 180 itself comprises antenna contact pads 185. The antenna carrier 130 may be comprise from different dielectric materials, for example, paper, or the organic polymers described above (polyimides, polyesters, polycarbonate, etc.) in the form of thin flexible foils which are then coated with a variety of metals, such as cooper (Cu), aluminium (Al), nickel (Ni), palladium (Pd), platinum (Pt), gold (Au), or their alloys, or any combination of the foregoing, and which carry the antenna structure. Antenna carrier 130 may be formed from a web of dielectric material that is coated with at least one of the aforementioned metals or their alloys. In accordance with this invention, the RFID antenna structures are manufactured by exposing the coating to a laser beam, i.e., using laser ablation.

Strap 102 is made of a flexible dielectric carrier material and comprises the strap carrier 150 and the structured metallic layer 160, which is produced using laser ablation in accordance with the invention. The materials used for strap carrier 150 may comprise polyesters, polyimides, polycarbonates, PEEK, PEK, LCP in the form of flexible foils. The metallic layer 160, which is to be structured using laser ablation in accordance with the invention may comprise Cu, Ni, Au, Al, Pt, Pd, Fe, Ti or their alloys and may have layer thicknesses up to approximately 1 micron. In order to enhance the adhesion to the metal to polymer interface special tie-coats are used.

Such tie-coats usually comprise Cr, Ni, Fe, Ti and their alloys and have a thickness of up to approximately 20 nm. These tie-coats are removed during laser ablation together with the metallic coating. The strap carrier may be coated using physical vapour deposition, or chemically (electroless), or chemical vapour deposition or combinations thereof.

Microchip 140 is conductively connected to high precision pads 165 of strap 102 using an already known assembly process. Reflecting on the fact that with an edge length of the microchip of less than 1 millimeter (mm), the connective bumps of the microchip 140 have dimensions of smaller than 100 micron, strap pads 165 must also be produced with a high level of precision. This hurdle is aptly surmounted using the laser structuring technique in accordance with the invention.

This bond may be achieved for example using face down contact of the antenna pads 185 and the pads 160 of strap 102. The geometrical dimensions of pads 160 are in the mm range and are therefore non-critical for the reel-to-reel assembly process.

Figure 2:
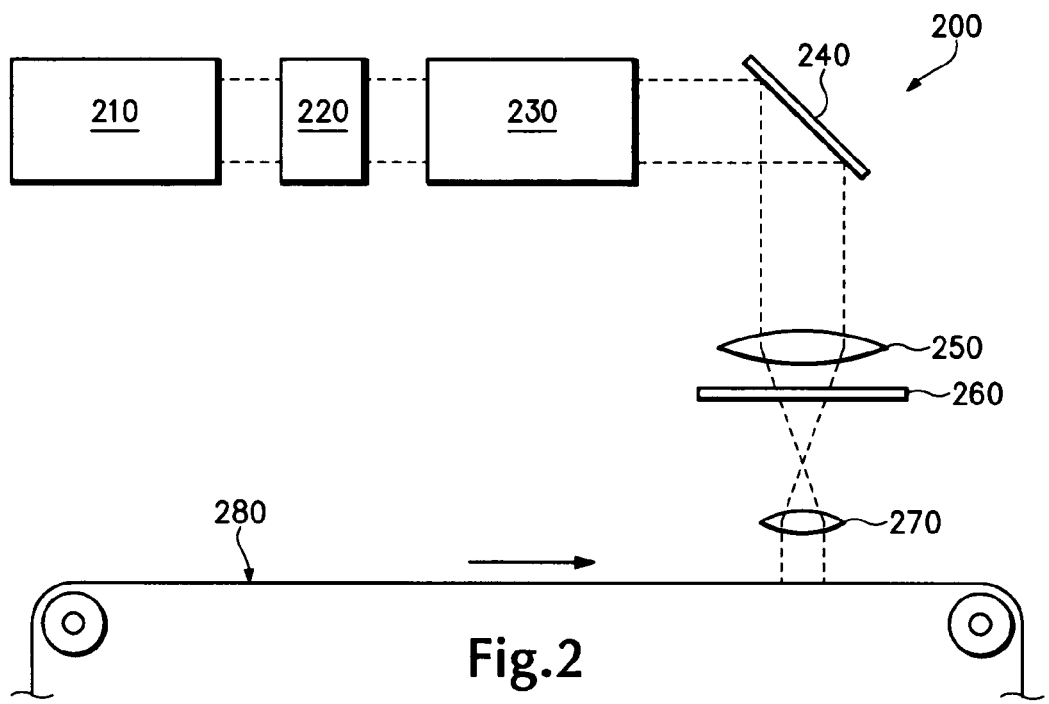
FIG. 2 is a schematic of one preferred embodiment of the invention.

FIG. 2 illustrates the principle of laser structuring using mask projection and pulsed Excimer lasers in the environment of a reel to reel process. The laser beam generated by the Excimer laser 210 passes through optical modules before it impinges on the metallic coated surface of web 280. Web 280 comprises a coat of metal or other conductive material and an insulating carrier substrate. The (optional) attenuator 220 serves to provide a defined attenuation of the energy of the laser pulse and so at to optimise it for the laser structuring of various coats and carrier materials. Attenuator 220 represents a variable and adjustable defined transmission of the laser beam. In the case of long-term processing of a specific material, attenuator 220 may be omitted with the optimisation of the laser beam for laser structuring being achieved using other optical modules. The beam shaping module 230 has the purpose of creating the optimal spatial intensity distribution of the mask pattern on the foil surface. This optimal distribution of intensity generally comprises equal level of intensity throughout the area of a rectangular field. In this case one refers to homogenous intensity distribution and refers to the arrangement of the optical components which result in the creation of such an intensity distribution as the homogeniser. Together with the homogeniser, the beam shaping module 230 may also have an upstream beam expander for the incoming beam or one or several deflecting mirrors 240 (usually with 90° beam deflection) which serve the purpose of folding the path of the beam to fit within the space envelope of the machine. The beam shaping module 230 may also contain Diffractive Optical Elements (DOE) which serve the purpose of redistributing the light to match areas having complex geometries. The field lens module 250 generally located in front of the mask serves the purpose of guiding the light into the entry aperture of the lens 270. The mask 260 generally comprises an enlarged positive image of the structures to be formed on the coating of the foil made up of patterns which are non-permeable to the laser beam light. The other areas of the mask allow the transmission of the laser beam. The purpose of lens 270 is to reproduce the mask pattern on the surface of the web 280 in a typically reduced form.

The laser radiation impinging on web 280 results in direct ablation of the coating of web 280. The high energy of the Excimer laser pulses enables the structuring of areas having several square centimeters size with a single laser pulse. The duration of the pulse of an Excimer laser typically has a duration of several tens of nanoseconds. In this way it is possible to achieve very high precision structures in a coating on a fast moving foil surface without any noticeable loss in the edge focus (sharpness) of the structures. In the case of a pulse duration of 25 nanoseconds (ns) and a tape speed of 1 meter per second (m/s) the distance through which the tape travels during the laser pulse is only 25 nanometer (nm). Such a low level of tracking is practical undetectable and for all practical purposes enables "on the fly" laser structuring without affecting the precision of the structures generated by a laser pulse. Using this technique it is therefore possible to produce small layouts structured with a single laser pulse in rapid succession in the coating of a moving web. The laser triggering is synchronized to the speed of the web such that the layouts have a essentially consistent spacing to one another along the web, i.e., a constant pitch.

Figure 3:
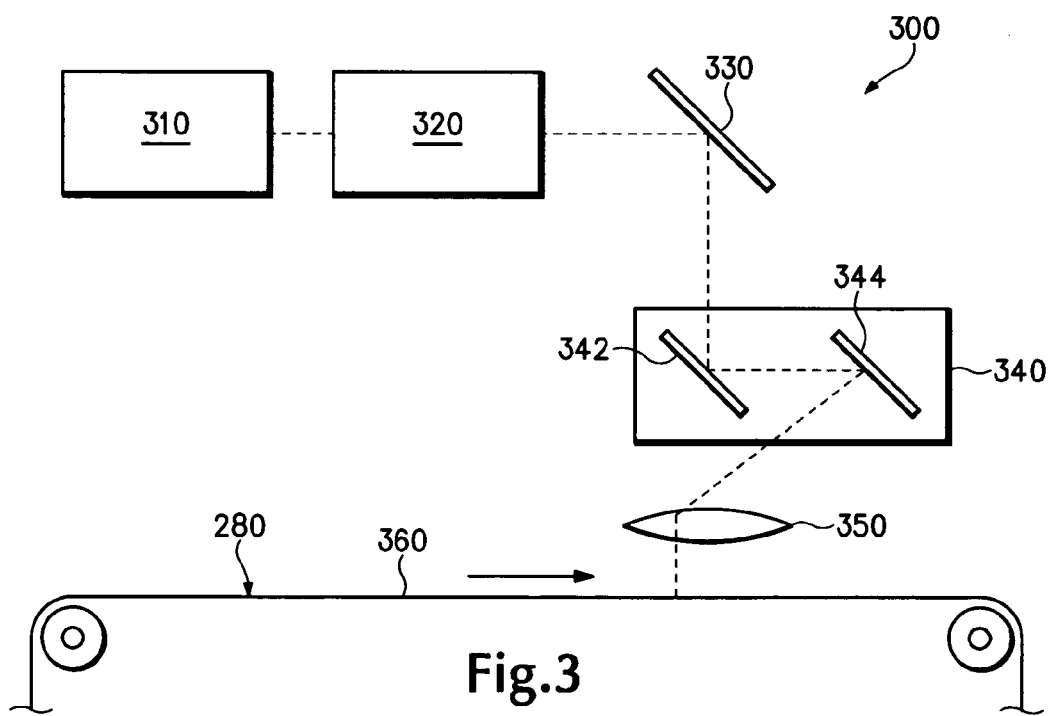
FIG. 3 is a schematic of a second preferred embodiment of the invention.

FIG. 3 illustrates the invention, in a reel to reel processing environment, using vectorial writing lasers and a continuous (cw) or pulsed Q-switched (quality switched) laser system 300. The beam generated by laser 310 passes through various optical components 320 which are used to shape the beam. These can in the simplest case comprise a beam expander or a linear translator but also Diffractive Optical Elements (DOE) to generate a flat top intensity profile which offers advantages for laser structuring compared with a Gaußian intensity profile whereas other optical components may also be applied to adjust the polarisation state of the laser beam. The laser beam may also pass through one or several deflecting mirrors 330 (generally having a 90° beam deflection) having the purpose of fitting the path of the beam to the specific machine layout.

The laser beam then finally passes through an XY scanning unit 340 which deflects the laser beam in two orthogonal directions according to a computer program. This is generally achieved using a galvanometer scanner having two rapidly moving mirrors which are each driven by a galvanometer although this may also comprise a piezo scanner, acousto-optic scanners and similar.

Lens 350 may be located between X-Y scanner and web 280. This set-up focuses the laser beam and/or generates the required beam profile on web surface 360 in all possible X-Y positions of the beam. Other arrangements are also possible, for example, in which lens 350 is located, in regards to the path of the laser beam, prior to the scanner, in which the focusing of the laser beam in the X-Y plane (the web surface) is achieved by dynamical adjustment of the focal Z-position with a synchronised moving linear translator. The impinging of the laser beam on the web surface results in local ablation of the coating. Therefore, it is possible to sequentially write isolating tracks in a conducting coating. The synchronisation of the X-Y scanner unit with the movement of the web also enables this process to take place with continuous movement of the web. The advantage of the vectorial writing laser structuring system compared with mask projection is the flexibility of the vectorial system, i.e, allows rapid modifications and adjustments of the layout that is to be laser generated on web 280.

Figure 4:
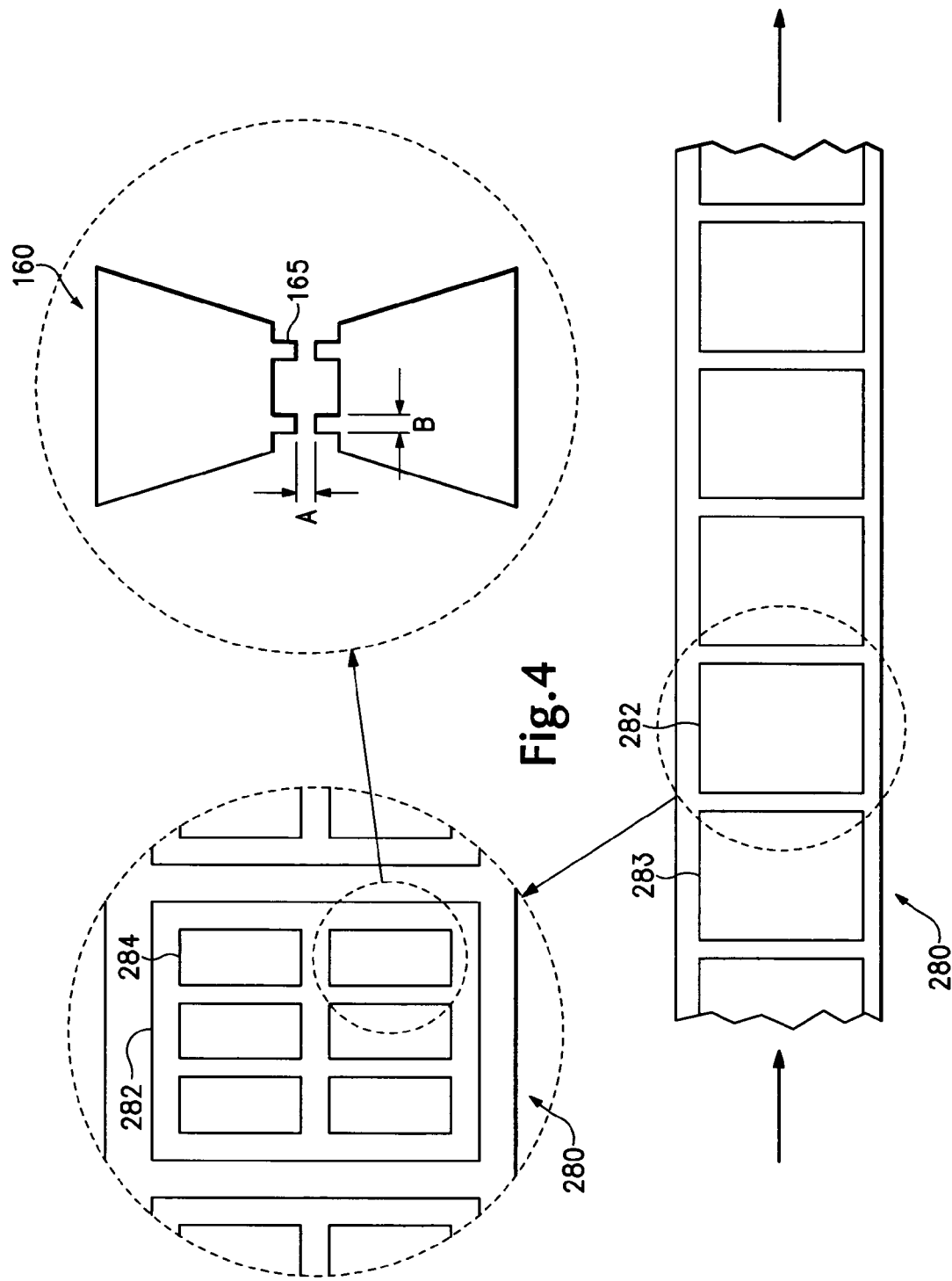
FIG. 4 illustrates the arrangement of the straps on a flexible material and the geometric tolerances in accordance with the invention.

FIG. 4 is a schematic illustrating the arrangement of straps on a flexible web 280. Web 280 comprises a substrate material in this case is a polyimide (UPILEX-S, manufactured by UBE Ind./Japan) having a width of 35 mm and a thickness of 50 microns. The material is coated by the BEKAERT company (Belgium) with a Cr/Ni tiecoat (thickness 10 nm) and a Cu layer of 150 nm. The laser ablation is achieved using for example an Excimer laser manufactured by the company Lambda-Physik/Germany (wavelength 308 nm, type STEEL 1000, energy density 120 mJ/cm$^2$, repetition rate 125 pulses per second, tape velocity 1 meter per second). The laser energy is sufficient to ablate and structure a full area metallic field 282 of dimension 28×10 mm in a reel-to-reel process with a single laser pulse.

The metallic foil travels at a continuous rate, i.e., without stops or interruptions, using a reel-to-reel system, as it passes under a laser beam. This "on the fly" laser ablation is highly efficient and enables high production rates with optimal precision tolerances. The mask comprises a chrome coated 4-inch quartz mask bearing the pattern to be structured on to the web material. Depending upon the application, this system allows for example 6 interposers/straps having dimensions of 7×3 mm to be ablated on this area per laser pulse. See exploded view of 282 of FIG. 4. Exploded view of strap 160 shows an individual strap with pads of 50 micron separation A and 50 micron width B in the microchip bond area. The implementation of laser technologies in accordance with the invention results in a geometrical deviation in the replication of successive layouts of less than 3 microns.

Practicing this invention in a reel to reel process, enables high levels of precision to be achieved in the reproducibility of the pitch (center to center distance) between one ablated laser field 282 to the next ablated field 283 (laser pulse after laser pulse) and so on. In this case, a tolerance of approximately 10 micron is achieved (reproducibility of processing sequence). This represents, as previously described, one of the major and key preconditions for successful downstream microchip assembly. The high precision laser-structured flexible substrate are ready or after deposition of additional metal coats as required, such as Cu, Ni, Au etc., to accept a microchip for attachment. Should further metallic coats be required depending upon application, this must be taken into account when planning the layout.

Figure 5:
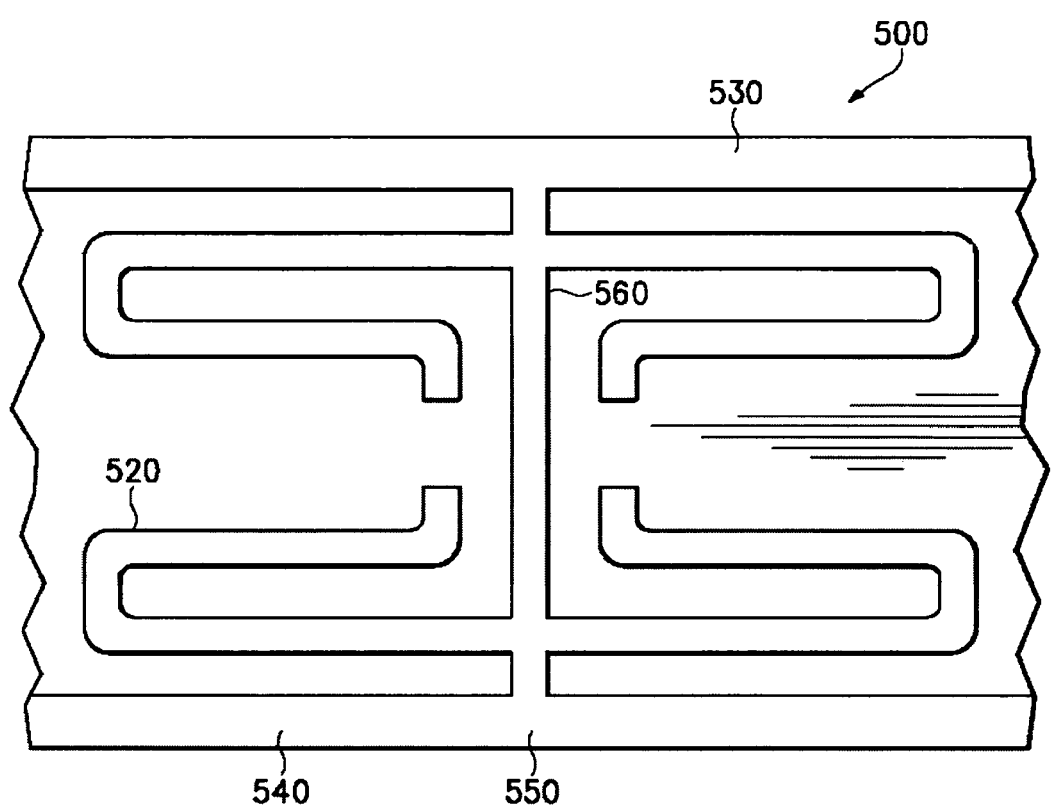
FIG. 5 illustrates an antenna structure made in accordance with the invention.

Similarly, RFID antenna structures can be produced using the techniques in accordance with the invention. FIG. 5, shows an antenna structure produced in accordance with the invention in which it is intended to add copper by way of galvanic deposition. A 35 mm wide flexible polyester material (MYLAR, DuPont) with a thickness of 50 micron and a copper coating of 100 nm is used for the laser ablation technique. The structuring of the isolating tracks to manufacture the antenna structure using reel-to-reel production is in this case achieved using writing techniques with a frequency tripled Q-switched Nd:YAG laser 355 nm, an XY galvanometer scanner with a 100 kHz pulse repetition rate, 40 micron focus diameter, 1 meter per second scan speed and 3 meter per minute tape speed.

After producing an antenna structure in accordance with the invention, additional metallic layers can be deposited on to the antenna structure as required by the needs of the manufacturer. In the embodiment shown in FIG. 5, RFID antenna 520 is electrically connected to web edges 530 and 540 at position 550. Accordingly, the edges 530 and 540 may be connected to the cathode in a galvanic cooper (Cu) bath for example, thereby enabling galvanic deposition of cooper in a reel-to-reel process. The electrical connecting track 560 has a width of 100 micron. The Cu layer that is built up during the galvanic process attains a thickness of 8 micron. In order to enable assembly, the two edge strips 530 and 540 are removed and the electrical connection is separated at position 550. This is achieved using standard techniques such as cutting, stamping, laser cutting etc. Other metals that can be used for a second coat include nickel, gold, tin (Sn), or a combination of tin and lead (Pb).

A preferred embodiment of the invention has been described and illustrated for purposes of clarity and example, it must be understood that many changes, substitutions and modifications will become apparent to those possessed of ordinary skill in the art without thereby departing from the scope and spirit of the present invention which is defined by the following claims.

What is claimed is:

1. A method of making a RFID component comprising the acts of
   a. providing a web, wherein said web comprises an insulating substrate having a conductive coating;
   b. exposing a portion of said web to a laser beam, whereby a first structure is formed in said conductive coating, said first structure having a first predetermined geometric shape, said first geometric shape having predetermined features, said features having predetermined dimensions; and
   c. moving said web relative to said laser beam wherein a second portion of said web is exposed to said laser beam, whereby a second structure is formed on said second portion, said second structure having a second geometric shape, said second geometric shape being substantially similar to said first geometric shape, said first structure and said second structure when compared to each other for similarity have a tolerance within 3 microns.

2. The method of claim 1, wherein said features have dimensions of at least 20 microns.

3. The method of claim 1, wherein said features have dimensions of at least 10 microns.

4. The method of claim 1, wherein said RFID component is an RFID strap.

5. The method of claim 1, wherein said RFID component is an RFID antenna.

6. The method of claim 5, where said antenna has features comprising winding widths and winding separations.

7. The method of claim 1, wherein the pitch between said first and said second structure has a deviation tolerance of less than 10 micron.

8. The method of claim 1, wherein act "c" is accomplished using a reel-to-reel device.

9. The method of claim 1, wherein said web further comprises a flexible organic insulating material.

10. The method of claim 1, wherein said insulating material comprises a thickness of no more than approximately 350 micron.

11. The method of claim 1, wherein said insulating material is selected from the group essentially consisting of polyimides, polyesters, polycarbonates, PEEK, PEK, LCP, and paper.

12. The method of claim 1, wherein said laser beam is produced by a pulsed Excimer laser.

13. The method of claim 12, wherein said laser beam is projected through a laser projection mask, whereby said structure is formed on said web portion.

14. The method of claim 13, wherein said conductive coating comprises a metallic coating having a thickness of at least 50 nanometers.

15. The method of claim 1, whereby said laser beam forms said structures by using an x-y-scanner system in a vectorial writing process.

16. The method of claim 15, wherein said conductive coating comprises a metallic coating having a thickness of at least 50 nanometers.

17. The method of claim 1, wherein said conductive coating comprises a metallic coating having a thickness of at least 50 nanometers.

18. The method of 17, wherein a tie coat is sandwiched between said metallic coating and said insulating substrate.

19. The method of claim 17, wherein said conductive coat is selected from the group essentially consisting of Cu, Ni, Au, Al, Pt, Pd and alloys of the foregoing.

20. The method of claim 1, further comprising the act providing a second metallic coat using galvanic processes, wherein said second coat is provided after said first coat is exposed to said laser beam.

21. The method of claim 20, wherein said second coat comprises materials selected from the group essentially consisting of Cu, Ni, Au, Sn, and a combination of Sn and Pb.

22. A method of making a RFID component comprising the acts of
   a. providing a web, wherein said web comprises an insulating substrate having a conductive coating;
   b. exposing a portion of said web to a laser beam, said laser beam being produced by a pulsed Excimer laser, whereby a first structure is formed in said conductive coating, said first structure having a first predetermined geometric shape, said first geometric shape having predetermined features, said features having predetermined dimensions; and
   c. moving said web relative to said laser beam wherein a second portion of said web is exposed to said laser beam, whereby a second structure is formed on said second portion, said second structure having a second geometric shape, said second geometric shape being substantially similar to said first geometric shape.

23. The method of claim 22, wherein said first structure and said second structure when compared to each other for similarity have a tolerance within 3 microns.

* * * * *